April 11, 1961 H. L. EASTUS ET AL 2,978,839
APPARATUS FOR FINISHING APERTURED GLASS ARTICLES
Filed April 14, 1958 2 Sheets-Sheet 1
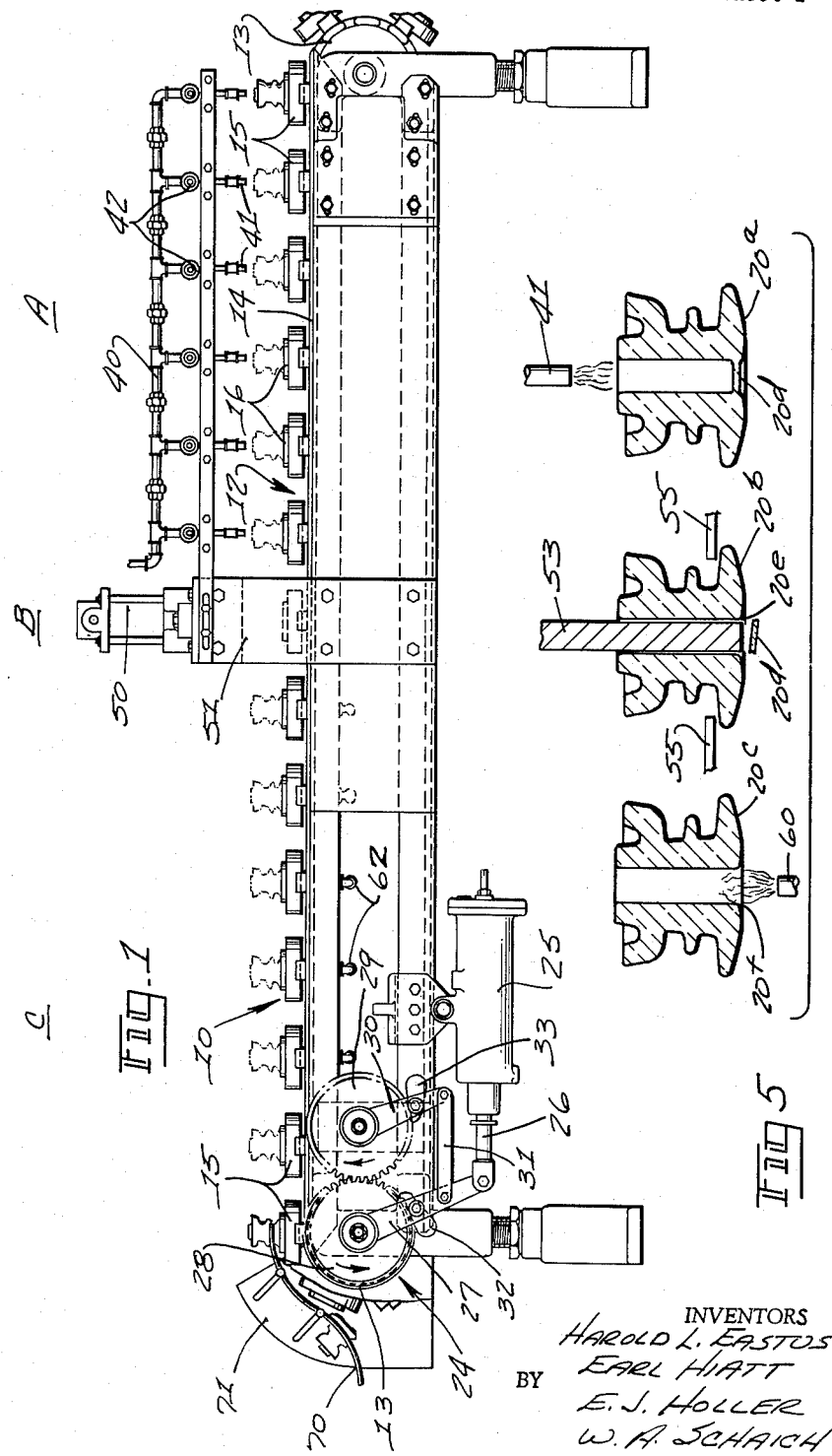
INVENTORS
HAROLD L. EASTUS
EARL HIATT
BY E. J. HOLLER
W. A. SCHAICH
ATTORNEYS

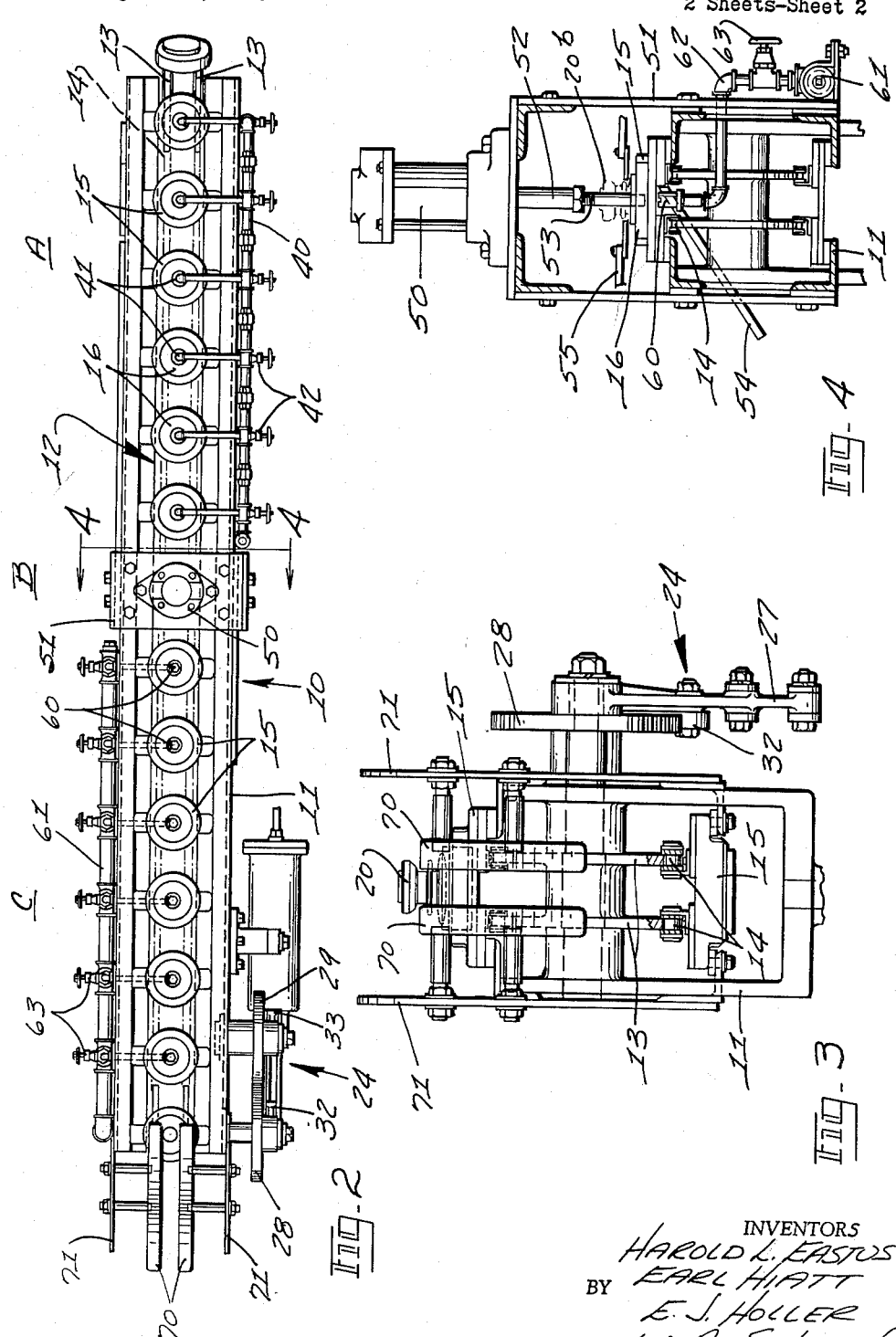

United States Patent Office 2,978,839
Patented Apr. 11, 1961

2,978,839

APPARATUS FOR FINISHING APERTURED GLASS ARTICLES

Harold L. Eastus and Earl Hiatt, Muncie, Ind., assignors to Kimble Glass Company, a corporation of Ohio Filed Apr. 14, 1958, Ser. No. 728,427

6 Claims. (Cl. 49—28)

The present invention relates to making apertured articles of glass or similar materials, and more specifically to the formation of full apertures in articles such as glass insulators or the like. The invention is particularly advantageous for use in removing thin windows or separating walls disposed in the apertures of articles which are formed in a press molding operation.

In manufacturing articles such as glass insulators having a central opening extending entirely therethrough, it is difficult and disadvantageous to form the articles with the full aperture in high-speed press molding operations. In such operations a charge of molten glass is delivered into a suitable mold of a press molding machine and a reciprocating plunger is employed to enter an upper portion of the mold to shape the charge into final form. The formation of the complete aperture concurrently with the body of the article frequently tends to foul either the mold or the plunger or both, the glass in the thinned area becoming cooled and tending to stick thereto. Also removal of the terminating portion of the aperture must be accomplished without introducing contaminating powdered glass into the mold. Where a plunger is operated to pass entirely through the article to simultaneously form the article with a full aperture, both plunger and mold bottom become badly scored with powdered and fragmented glass greatly reducing the useful life of these operating parts. After several hundred pieces are so pressed, the mold and plunger surfaces are frequently so severely damaged as to require replacement.

Heretofore, it has been common practice to press the articles with an integral thin window in the aperture, the window being removed in a subsequent handworking operation. Even when the window is made very thin at its periphery where joined to the article body, considerable force must be applied for its removal by a mechanical knock-out punching procedure. Obviously the article must be allowed to cool at least partially so that it may be handled during such window knock-out, and the window must be cooled sufficiently to facilitate its elimination.

The co-pending patent application of Stutske and Torok, entitled "Press Mold and Method of Operation," Serial No. 647,278, filed March 20, 1957 and assigned to a common assignee, discloses both novel apparatus and method for producing apertured glass articles such as insulators having a thin window which is formed to be readily frangible for subsequent elimination. According to the invention set forth in that application, the window portion is moved independently of the article body during final pressing of the article within the mold so that the thinned cooled area is peripherally and at least partially cracked, although it remains an integral part of the article.

Insulators have been previously molded with the described window portion located at the lower extremity of a nearly coextensive opening. After removal of each insulator from the forming machine it has been allowed to cool to a suitable temperature to permit handling and the window area has been forcibly cracked out of the opening by mechanical impact. The impacting is done by hand after which the fragmented area of the opening is finished by a hand grinding operation. In the case of tempered insulators this practice has produced finished articles which are unduly weakened at the area contiguous with the broken and ground-out window portion and has resulted in more costly manufacturing with an attendant greater amount of rejectable ware. When the window breakout and resurfacing is performed by hand, the completed article does not possess smooth strong surfaces coextensively with its full opening, this particular area being a primary source of stresses especially when the finished article is subjected to thermal shock or mechanical load while in service.

Accordingly, it is an object of this invention to provide novel apparatus for producing full uniform apertures in molded articles, the apparatus comprising a series of aperture window cooling stations, a window knock-out station and a series of aperture reheating stations, the finished articles having improved resistance to thermal and mechanical shock.

Another object of this invention is to provide apparatus for finishing glass articles having a window disposed within a nearly full aperture as formed in a press molding operation, the apparatus comprising conveying means to transport the articles stepwise through a series of window cooling stations, a single window knock-out station and a series of aperture reheating stations.

Another object of this invention is to provide a finishing machine for apertured articles having a surplus window therein, whereby the articles are conveyed intermittently through a plurality of aperture window cooling positions to a window eliminating position and finally through a plurality of aperture reheating positions.

A further object of this invention is to provide an apparatus for finishing apertured articles having a surplus window therein having means for selectively cooling the window portion immediately following article forming, eliminating the window portion by a uniform mechanical impact and rehealing the glass surfaces of the aperture by localized heating particularly in the area of window elimination.

A still further object of this invention is to provide finishing apertured glass articles having a surplus separating wall in an aperture thereof having means for cooling the wall with a suitable coolant while the article retains considerable residual heat of formation, uniformly supporting the article surrounding its aperture, penetrating the full aperture with a rod-like device to forcibly contact and eliminate the separating wall and reheating the aperture surfaces contiguous with the eliminated wall to reshape the glass thereat.

The specific nature of this invention, as well as other objects and advantages thereof, will become apparent to those skilled in the art from the following detailed description, taken in conjunction with the annexed sheets of drawings on which, by way of preferred example only, are illustrated the preferred embodiments of this invention.

On the accompanying drawings:

Fig. 1 is a side elevational view of the entire machine for finishing apertured articles.

Fig. 2 is a top plan view of the machine.

Fig. 3 is an end view of the discharge end of the machine.

Fig. 4 is a vertical sectional view taken along the line 4—4 of Fig. 2 illustrating the window punch-out station.

Fig. 5 is a schematic view of an insulator at the three primary stations of the machine.

While the present invention will be specifically described as applicable to finishing apertured glass articles such as telephone line insulators each having a full central opening for pin mounting, it is fully contemplated that the invention is equally applicable to finishing other apertured articles such as lubricating cups. The subject machine is especially suited for location adjacent to the article forming machine for conveying and finishing the articles prior to annealing or tempering.

Referring now to the drawings and particularly to Fig. 1, the machine 10 consists of frame 11 upon which is mounted a conveyor 12 operable in a lineal direction. Conveyor 12 has a pair of end sprockets 13 mounted at each end of the machine over which travel a pair of parallel endless belts or chains 14 in mesh with the sprockets. Conveyor 12 has a plurality of receptacles 15 located in uniformly spaced-apart relationship affixed to and disposed between the conveyor chains 14. Each of the receptacles 15 has a contoured insert 16 having an upper surface complemental to the lower surface of an insulator 20. Each insert 16 has a central opening coextensive with the aperture in each insulator 20. The contoured supporting surface of each receptacle insert 16 matches the configuration of the lower extremity of each particular insulator 20 to be processed during a single campaign of the machine. Inserts 16 may be collectively removed and replaced by other parts depending upon the size and shape of the insulator or other article to be processed.

The sprockets 13 at the left hand end of the machine 10 (Fig. 1) are driven in a counterclockwise direction by a gear and ratchet assembly 24 operated by an air cylinder motor 25. The sprockets 13 drive the conveyor 12 from right to left as shown in Figs. 1 and 2. Air cylinder motor 25 contains a reciprocating piston which is connected to piston rod 26. Lever arm 27 is pivotally connected to piston rod 26 at one end and freely connected to the drive shaft of conveyor sprockets 13 at its other end. A driving gear wheel 28 is affixed to this drive shaft adjacent to lever arm 27. Another gear wheel 29 is arranged essentially in the same plane to mesh with gear wheel 28. A pair of pivotally connected lever arms 30 and 31 are mounted with their opposite ends adapted to pivot about the axis of gear wheel 29 and an intermediate area of lever arm 27 respectively.

Lever arm 27 carries a ratchet assembly 32 adapted to engage the teeth of gear wheel 28 to effect its angular rotation in a counterclockwise direction only. Lever arm 30 carries a similar ratchet assembly 33 adapted to effect angular rotation of gear wheel 29 in a clockwise direction only.

When piston rod 26 is moved by air cylinder 25 from right to left, ratchet assembly 33 engages gear wheel 29 to effect its clockwise rotation and thus counterclockwise rotation of meshing gear wheel 28. The conveyor 12 is then moved from right to left through essentially one-half its lineal distance between adjacent stations. During this interval ratchet assembly 32 is disengaged from gear wheel 28. On the return stroke of piston rod 26 from left to right which follows immediately, ratchet assembly 32 engages gear wheel 28 and actuates its further angular rotation counterclockwise to move the conveyor 12 from its intermediate position to the next stop position. During this time ratchet assembly 33 is disengaged from gear wheel 29 which is freely rotated by gear wheel 28. Thus, one cycle of piston rod 26 moves the receptacles 15 from one position to the next where they come to rest until another cycle is initiated. Cycling of piston rod 26 is arranged to be sufficiently fast so that the conveyor 12 appears to move without interruption from one position to the next. Operation of air cylinder motor 25 is preferably timed in sequence with the insulator forming machine.

The machine as illustrated consists of fourteen individual positions across the upper horizontal surface of conveyor 12. The apertured glass articles, which for the purposes of this specification have been referred to generally as insulators 20, are introduced singly into a receiving cup or insert 16 of each receptacle 15 at the right hand end of the machine (Figs. 1 and 2). The insulators 20 are then conveyed through the various positions in a stepwise manner coming to rest at each position to the left hand end of the machine where they are automatically unloaded.

The first six stations of the machine designated by the letter A comprise aperture window cooling stations. A manifold 40 is located above conveyor 12 essentially parallel therewith to supply cooling fluid to a series of individual discharge nozzles 41. One nozzle 41 is disposed coaxially with the aperture of an insulator 20 at rest at each of the window cooling stations. Each nozzle 41 is located in near relationship to the upper end of the stationary insulator and directed downwardly to discharge cooling air, for example, into its aperture. An individual supply line leading from manifold 40 to each nozzle 41 has a valve 42 mounted therein for control of the cooling fluid.

The cooling fluid such as air which is supplied to the individual nozzles 41 by a manifold 40 may preferably be arranged to cycle on and off during periods of rest and motion of the conveyor 12. This is preferred to secure cooling of only the window or separating wall portion in the insulator aperture and not exterior surfaces of the insulator. Thus, while the insulators are at rest at the six cooling stations, jets of cooling air are delivered by nozzles 41 into the apertures. The window portion is selectively cooled to a temperature level in the range of from about 300° to 500° F. at the last cooling station. The body portions contain a considerable amount of residual heat from the forming operation. By proper adjustment of the air jets delivered to impinge upon the aperture window, the insulator is conveyed from the last air cooling position with its window at a considerably lower temperature than its body to a window knock-out station designated by the letter B.

An air cylinder motor 50 is mounted above conveyor 14 at station B on a suitable support frame 51 with a piston rod 52 extending downwardly in coaxial alignment with a single conveyor receptacle 15 at rest at the window knock-out station. The lower end of piston rod 52 carries a knock-out rod 53 consisting of a hardened right-cylindrical metallic pin. Rod 53 has a diameter slightly less than the insulator aperture for proper clearance therein. Rod 53 is adapted to fully penetrate the insulator aperture to forcibly contact its window portion 20d effecting a peripheral cracking and complete elimination thereof. The air cylinder 50 is timed to vertically operate the punch-out rod 53 while the insulator 20b is retained stationary at the window knock-out position.

In Fig. 4 the rod-like element 53 is shown in its lowermost position extending completely through the insulator 20b. An inclined plate 54 is mounted at the knock-out station immediately below rod-like element 53 and the opening in receptacle insert 16 to facilitate the removal of fragmented pieces of the insulator window portion 20d. Punch-out rod 53 is arranged to fully penetrate the vertical opening of insulator 20b at rest as shown in Fig. 5. During such punching the lower surfaces of the insulator 20b are uniformly supported in cup-like insert 16 of complemental contour to avoid distortion or non-uniform breakage of its lower region. After elimination of surplus window 20d, the contiguous edges 20e of the aperture are rather rough and uneven.

A pair of stop plates 55 are mounted within the frame 51 extending inwardly over and above the lower portion of insulator 20b. Their inner extremities are arranged to retain the insulator in its cup in the event it is elevated during withdrawal of the rod 53. This may occur when rod 53 tends to stick in the newly punched full aperture. Thus, positive control over the insulator is maintained during both the downstroke and upstroke of rod 53.

Six aperture rehealing stations designated by the letter C, as shown in Figs. 1 and 2, follow the knock-out station. An individual gas burner 60 (Figs. 2 and 4) is located at each of these stations extending upwardly through conveyor 14 and coaxially with the full openings 20e of the insulators 20c. Each of the burner nozzles 60 is supplied a combustible fuel mixture of natural gas and air, or natural gas and oxygen, by a manifold 61 arranged parallel to the machine frame 11 just below the upper surface of conveyor 14. Each of burner nozzles 60 is arranged to deliver a pattern of burner fires upwardly through the insulator 20c to heat-soften and refinish the glass at the aperture lower portion 20f (Fig. 5). The burners which preferably are circular are located in near relationship and immediately below receptacles 15 to deliver their fires through the central openings in the inserts 16 to impinge upon and smoothly reshape the lower areas of the full apertures.

Each burner nozzle 60 is connected to manifold 61 by an individual supply line 62 having a control valve 63 therein. As shown in Figs. 2 and 4, burner nozzles 60 are located at each of the six reheating stations adjacent to lower portions 20f of the apertures for their heat softening sufficiently to rework the glass. The burner fires may be individually adjusted to supply a flame pattern of the desired shape and intensity into the insulator openings.

A pair of slide bars 70 is located at the discharge end of the machine having their upper ends extending horizontally into near relationship with the last elevated receptacle 15 at the left end of the machine (Figs. 1 and 2). The slide bars 70 are gently curved downwardly and adjustably arranged so that a necked portion of the insulator 20 will be carried therebetween by its supporting receptacle 15. The insulator 20c may then slide down the gently curved surfaces of the slide bars 70 onto an annealing lehr conveyor, for example. Slide bars 70 are adjustably disposed within a pair of vertical end plates 71 attached to the machine frame 11.

The method of aperture finishing may be summarized as follows:

An insulator 20 is deposited on one end cup or receptacle of the machine as shown in Figs. 1 and 2. Each of the first six succeeding positions of the intermittent conveyor 12 have small air jets aligned with the stopping points of the several cups. These first six stations alternately receive off and on air, i.e., the air coming on when the conveyor is stationary and being turned off while the conveyor is moving. Each of these air jets impinge the thin glass portions to be removed from the aperture of each insulator. The conveyor 12 moves the insulators to these stations successively where cooling air blasts are directed into the aperture to impinge the window portion. This is repeated at each of the window cooling stations. At the last cooling station the thin glass window has been cooled to a temperature ranging from about 300° to 500° F., whereupon it is moved to the knock-out station.

With the insulator at rest at the knock-out station a hardened plunger having a diameter slightly smaller than the insulator aperture is extended downwardly therethrough, and engages the thin window causing it to be extracted. Each time the conveyor comes to rest the air cylinder motor 50 is operated to cause its hardened knock-out rod 53 to penetrate an insulator therebelow to push-out its window. The penetrating rod 53 is then elevated by the air cylinder. The conveyor then moves the insulator to six reheating stations.

Under each of these stations is located a small burner which serves to heal or knead the glass at the ragged edges where the thin window has been removed. This reheating is continued at each of the six reheating stations until at the end of the conveyor, the insulator is picked up by slide bar elements 70, one being disposed on either side of the insulator. As the conveyor finally moves the insulator and its retaining cup drops away at the machine end, as shown on Figs. 1 and 2, the grooved or necked central portion of the insulator passes into and along the slides. Final movement of the insulator by the conveyor causes the insulator to slide down the bars 70 onto a receiving table or annealing lehr conveyor.

Each stepwise operation of the machine is preferably timed to operate in synchronism with the forming press. The apparatus may then finish an insulator and be available to receive a newly formed insulator immediately following its press molding.

The glass adjoining the area of window removal is reworked in the present invention while the body of the article is still hot from its forming operation. Upon subsequent tempering of the insulators they exhibit overall properties of exceedingly high thermal shock and mechanical shock resistance. With such reheating no so-called checks or scars remain in the glass surfaces of the completed articles which would tend to cause their weakening at the openings.

Various modifications may be resorted to within the spirit and scope of the appended claims.

We claim:

1. In combination, apparatus for removing a thin window portion disposed within an aperture of freshly formed glass articles comprising conveyor means adapted to transport intermittently a series of said articles as formed, means to drive said conveyor means in stepwise advancing movement, said conveyor means having a plurality of movable contoured receptacles adapted to support the lower portion of each conveyed article surrounding its aperture, means disposed coaxially with the apertures of said articles as conveyed to direct a cooling fluid therein, a window knock-out device having a vertically operable rod-like element disposed coaxially with the apertures of said articles at a knock-out station, means to operate said rod-like element through the aperture of a stationary article in alignment therewith and heating means disposed adjacent to and coaxially with the apertures of the conveyed articles to heal the glass after window removal.

2. In combination, apparatus for removing a thin window portion disposed within an aperture of freshly formed glass articles such as insulators and the like comprising a horizontal conveyor adapted to transport stepwise a plurality of said articles in rectilinear spaced-apart relationship from a forming machine to an annealing lehr, means to drive said conveyor in intermittent advancing movement, said conveyor having a series of window cooling stations, a single window knock-out station, and a series of aperture reheating stations, said conveyor comprising a series of spaced-apart movable cup-like elements contoured to support the lower portion of each conveyed article surrounding its aperture, means disposed coaxially with the apertures of said articles while at rest on said conveyor to direct a cooling fluid therein at said window cooling stations, a vertically operable knock-out device disposed at the knock-out station above said conveyor coaxially with an aperture of one article for penetrable movement therethrough, means to effect vertical movement of said knock-out device in synchronism with intermittent movement of said conveyor driving means, and heating means disposed adjacent to and coaxially with the apertures of said articles while at rest on said conveyor to heal the glass contiguous with said apertures at said series of aperture reheating stations.

3. The combination set forth in claim 2, said cooling means comprising a series of discharge orifices directed to deliver cooling air into said apertures with said articles at rest at said window cooling stations.

4. The combination set forth in claim 2, said knock-out device comprising a hardened metallic rod vertically operable by an air cylinder motor and piston to penetrate said aperture to contact said window portion for its elimination.

5. The combination set forth in claim 2, said heating means comprising at least one burner fire located at each aperture reheating station below and adjacent to said aperture for healing the glass subsequent to window portion elimination.

6. In combination, apparatus for automatically removing a thin window portion disposed within a central aperture of freshly formed glass articles such as insulators and the like, comprising a horizontal conveyor adapted to convey stepwise a plurality of said articles in spaced-apart relationship with their apertures in vertical alignment from a forming machine to an annealing lehr, means to operate said conveyor in stepwise advancing movement, said conveyor having a plurality of window cooling stations, a single window knock-out station and a plurality of aperture reheating stations, said conveyor comprising a series of interconnected movable cup-like receptacles having a complemental contour to the supported surfaces of each of said articles surrounding its aperture, at least one discharge nozzle disposed adjacent to and essentially coaxially with the article aperture at each window cooling station to direct cooling fluid thereinto, a vertically operable punching device located above said conveyor essentially coaxially with an aperture of one article at rest at the knock-out station for penetrable movement therethrough, means to operate said punching device in a vertical direction into and out of forcible contact with said window portion for its removal, and at least one burner fire disposed adjacent to and essentially coaxially with the article aperture at each aperture reheating station to heal the glass contiguous with the area of window portion elimination.

References Cited in the file of this patent

UNITED STATES PATENTS

| 347,742 | Rylands | Aug. 17, 1886 |
| 810,474 | Doane | Jan. 23, 1906 |
| 852,129 | Macbeth | Apr. 30, 1907 |
| 2,394,116 | Snyder et al. | Feb. 5, 1946 |
| 2,573,365 | Scholes et al. | Oct. 30, 1951 |

FOREIGN PATENTS

| 15,281 | Great Britain | 1884 |